United States Patent
Yang et al.

(10) Patent No.: US 11,830,125 B2
(45) Date of Patent: *Nov. 28, 2023

(54) RAY-GUIDED WATER CAUSTICS

(71) Applicant: Nvidia Corporation, Santa Clara, CA (US)

(72) Inventors: Xueqing Yang, Shanghai (CN); Nan Lin, Shanghai (CN)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,330

(22) Filed: Jun. 17, 2022

(65) Prior Publication Data
US 2022/0319097 A1   Oct. 6, 2022

Related U.S. Application Data

(63) Continuation of application No. 17/077,395, filed on Oct. 22, 2020, now Pat. No. 11,367,241.

(51) Int. Cl.
*G06T 15/06* (2011.01)
*G06T 15/50* (2011.01)
*G06T 15/80* (2011.01)

(52) U.S. Cl.
CPC ............ *G06T 15/06* (2013.01); *G06T 15/506* (2013.01); *G06T 15/80* (2013.01); *G06T 2210/36* (2013.01); *G06T 2215/16* (2013.01)

(58) Field of Classification Search
CPC ....... G06T 15/06; G06T 15/506; G06T 15/60; G06T 15/80; G06T 2210/36; G06T 2215/16
See application file for complete search history.

(56) References Cited

U.S. PATENT DOCUMENTS

| 5,877,777 A | 3/1999 | Colwell |
| 2012/0256939 A1 | 10/2012 | Kulla |
| 2017/0109920 A1 | 4/2017 | Jung |

(Continued)

OTHER PUBLICATIONS

Umenhoffer, Tamás, Gustavo Patow, and László Szirmay-Kalos. "Caustic triangles on the GPU." Proc. Computer Graphics International. 2008. (Year: 2008).*

(Continued)

*Primary Examiner* — Daniel F Hajnik
(74) *Attorney, Agent, or Firm* — Hogan Lovells US LLP

(57) ABSTRACT

Raytracing can be used to generate high quality, physics-based water caustics patterns in real time. A caustics map is generate to represent locations and normals of points across a water surface. Rays from a light source that are reflected and refracted from these points, as determined by the locations and normals, and can generate hit points on a surface. Neighboring points can be used to help determine the resulting caustics pattern. In one embodiment, information for neighboring points in the caustics map can be used to generate scale factors for geometric regions to be projected onto the surface for each hit point. In another embodiment, these points serve as vertices of a caustic mesh that can be projected onto the surface, where the brightness at a primitive is determined by the size of the primitive area defined by the vertices of the caustics mesh.

20 Claims, 12 Drawing Sheets

(56) References Cited

U.S. PATENT DOCUMENTS

2019/0318533 A1  10/2019  Gruen

OTHER PUBLICATIONS

Non-Final Rejection issued in U.S. Appl. No. 17/077,395 dated Jul. 20, 2021.
Notice of Allowance issued in U.S. Appl. No. 17/077,395 dated Mar. 1, 2022.
Bo, Qin, et al., "A Simple and Quick Method for Rendering Underwater Optical Effect," Computer Graphics, Imaging and Visualisation (CGIV 2007), IEEE, 2007.

\* cited by examiner

RAY-GUIDED WATER CAUSTICS

CROSS-REFERENCE TO RELATED APPLICATIONS

This application is a continuation of U.S. patent application Ser. No. 17/077,395, filed Oct. 22, 2020, entitled "RAY-GUIDED WATER CAUSTICS," the full disclosure of which is hereby incorporated herein by reference in its entirety for all purposes.

BACKGROUND

As the resolution and quality of displays continues to increase, there is a corresponding increase in demand for higher quality content. This can include generated or rendered content that is not only displayed with higher resolution at faster frame rates, but that also should appear and move as if it were actual, physical content captured by a camera. This can include, for example, not only the appearance and movement of bodies of water, but also the caustic patterns generated by light that is reflected or refracted from the water surface. Another complexity is that, for applications such as computer gaming or virtual, augmented, or mixed reality, these high-quality, physically-based water caustic effects need to be rendered in near real time. While advancements in technology such as graphics processing unit (GPU)-based ray tracing can enable these patterns to be generated fast enough to be included in games running at least 60 frames per second (fps), existing approaches may not provide sufficient realism or quality of appearance. For example, certain approaches require expensive denoising procedures to generate visually appealing water caustics, which can be computationally expensive or prohibitive to be used effectively in real-time. Further, these approaches can produce artifacts due to inaccurate brightness distributions, and can produce blurry caustic patterns depending in part upon a type of denoising that is used.

BRIEF DESCRIPTION OF THE DRAWINGS

Various embodiments in accordance with the present disclosure will be described with reference to the drawings, in which.

DETAILED DESCRIPTION

Figure 1A:
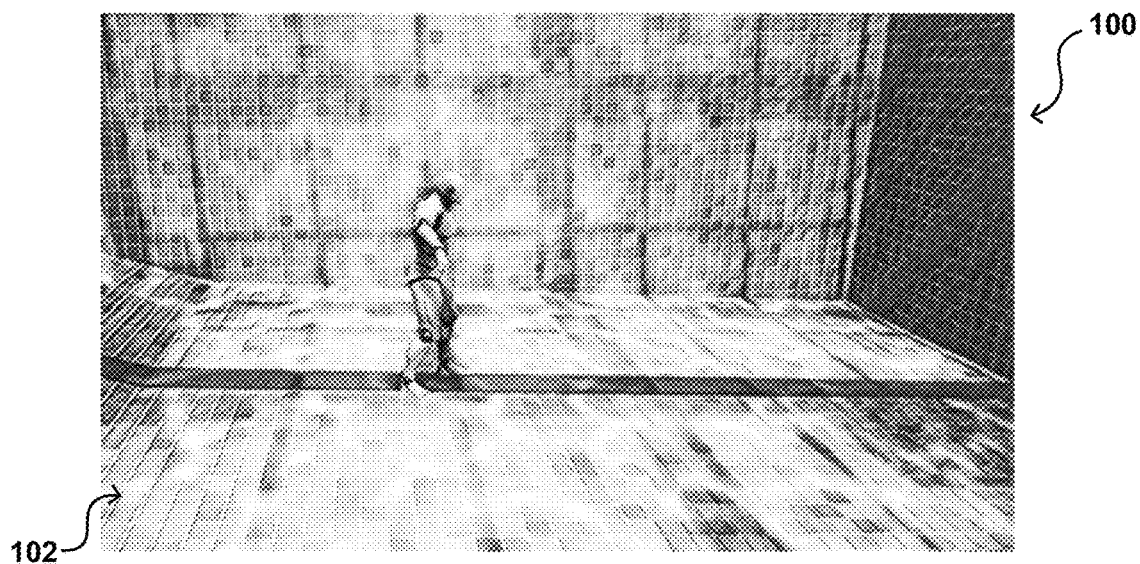
FIGS. 1A, 1B, and 1C illustrate images that can be generated, according to at least one embodiment.
Figure 1B:
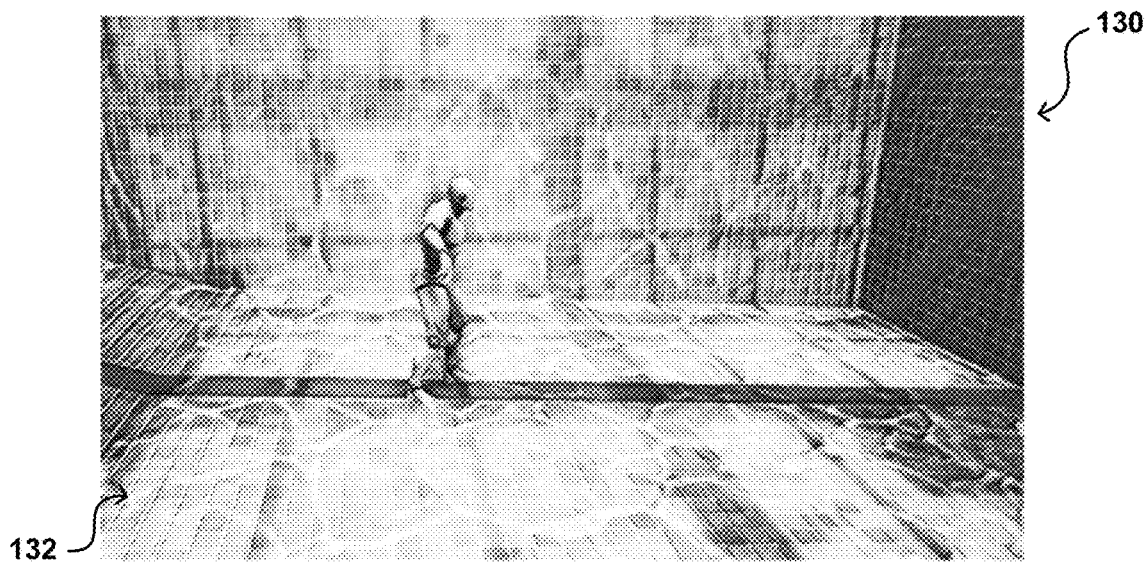
Figure 1C:

Approaches in accordance with various embodiments provide for realistic and physics-based generation of patterns, such as water caustic patterns. When light from a virtual light source is incident on the surface of water, for example, the rays of incident light can be both reflected and refracted by that surface. For water that has moving waves, thus resulting in a surface with several peaks and valleys, this can result in more rays being directed towards certain points on a surface than others, resulting in a pattern referred to as a caustic pattern, although other such patterns can be generated from surfaces or objects as well. FIGS. 1A through 1C illustrate examples of caustic patterns that may be rendered in accordance with various embodiments. In these example images, a light source such as the sun can be approximated as emitting rays that are refracted by the surface of the water (not shown) in a pool, resulting in a caustic pattern 102 being present on the walls, ceiling, and floor of the pool. These patterns can be affected by various factors, such as the type and position of light sources in the scene, number of light sources, height of waves on the water surface, depth of the water, and so on. In order to generate realistic caustics, it can be necessary to compute the visibility from arbitrary points on a water surface along refracted directions, as well as to compute the visibility from points on the interface along the reflected directions.

In various applications, such as for computer gaming and animation, it can be desirable to generate caustic patterns in such a situation that appear and move like real, physical caustic patterns. For highly accurate simulations, however, this can involve a very large number of rays to be traced and data to be processed, which may exceed the resource capacity (e.g., processing and memory) of a system performing the rendering or image generation. Further, for applications such as gaming the frames of image data will need to be refreshed or updated at a specified or minimum frame rate, such as at least sixty frames per second (FPS), and the complexity of accurate simulation can prevent that simulation to be used due at least in part upon an inability to satisfy these timing requirements.

In various conventional approaches, water caustic effects in scenes containing water surfaces were perfunctorily made using scrolling textures in a game engine. Introduction of graphics processing units (GPUs) with fast ray tracing support provided for real-time rendering the effect at higher image qualities. A water caustic pattern has characteristics of being highly dynamic and interactive, often covering a large area, and only requiring one-bounce light reflection or refraction. A method such as caustics mapping can be used to implement surface and volumetric caustics using ray tracing, such as on DirectX Raytracing (DXR) from Microsoft Corporation. In at least one approach, ray tracing can be used to determine light that is refracted onto a surface, resulting in a caustic pattern. In order to generate a realistic caustic pattern using such an approach, the pattern generation may need to be performed at high resolution, which may be impractical for performance reasons. Accordingly, the process will typically use lower resolution to generate these caustic effects, then apply a post-processor such as a denoiser to avoid gaps and smooth out the pattern generated. As illustrated in image 100 of FIG. 1A, however, this can result in a caustic pattern 102 that is somewhat blurry due to factors such as a lower resolution pattern of discrete points and the denoising of those points.

Approaches in accordance with various embodiments can provide for shaper caustic patterns, such as the pattern 132 illustrated in the image 130 of FIG. 1B. Using such a process, sharper details can be maintained in caustic patterns by, for example, applying photon (e.g., a rectangle or other geometric shape) difference scattering or procedural meshes. Such a process can also support various light types and relevant properties, including textured area light. Such a process can also provide acceptable performance over vast scene regions, such as through use of cascaded caustics maps. Such a process can also provide improved performance, such as through use of a bias-variance trade-off that can be user-configurable. Even zoomed views of a caustics pattern 162 can demonstrate sharp, continuous caustics as illustrated in image 160 of FIG. 1C.

In at least one embodiment, there can be at least two sets of maps or buffers used, which can include at least one caustics map that stores rasterized water geometry in light-view, as well as a caustics buffer that accumulated photon footprints in screen space. In at least one embodiment, a first caustic maps stores 3D position data while a second caustic map stores surface normal data. A general workflow that takes advantage of these buffers can consist of at least four steps. In a first step, water surfaces are rendered into caustics maps from a light view, recording the positions and normals of points along the water surface. Rays from these positions recorded in the caustics map are then dispatched, with the rays being traced along the reflected or refracted directions calculated from the surface normals. Once the rays hit the scene, information for the hit points can be recorded. The caustics can be rendered into the caustics buffer, which can be placed in screen space, using the data of the hit points obtained previously. Denoising can then be performed on the caustic buffer. Then the result is composited with the scene.

Figure 2A:
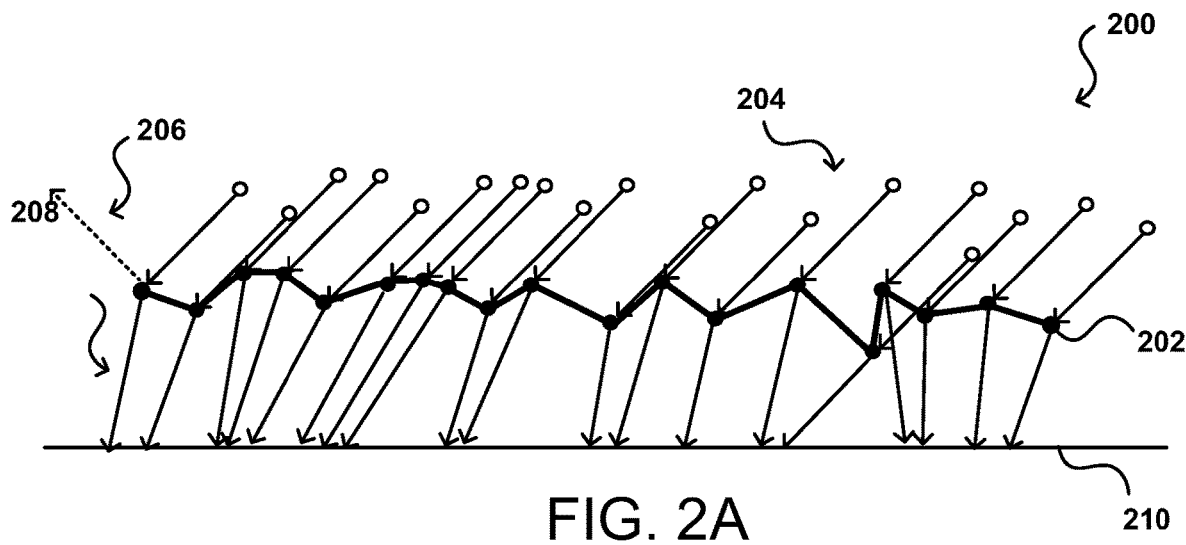
FIGS. 2A, 2B, 2C, 2D, and 2E illustrate ray tracing approaches that can be used for determining water caustics, according to at least one embodiment.
Figure 2B:
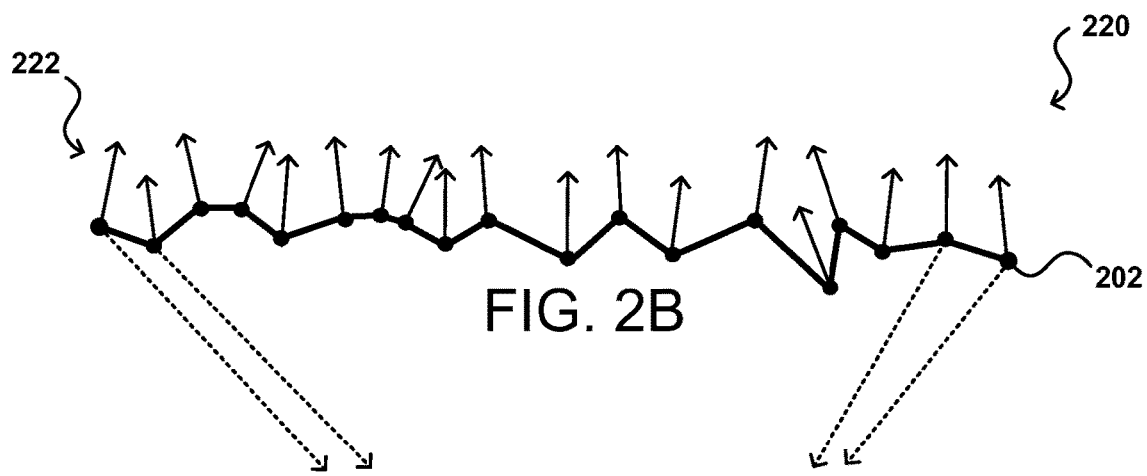
Figure 2C:
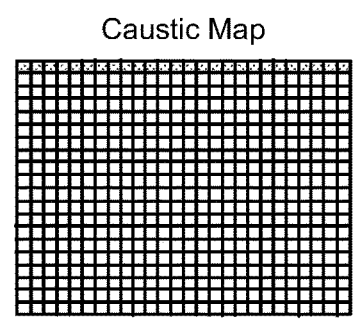

FIG. 2A illustrates an example cross-sectional view 200 of the refraction and reflection of rays of light that are incident on a water surface 202 that includes variations due to waves or other such motion. In this example, the incoming incident rays of light 204 are substantially parallel, coming from a very distant light source such as the sun. When a ray hits a point along the water surface 202, a portion of that ray will be reflected 208, and a portion of that ray will pass through the water surface and be refracted in a slightly different direction, to be incident on a surface 210, object, or terrain. The amount or direction of refraction can depend upon various factors, such as the type of liquid and the environment in which the light is initially transmitted to the water surface. The direction will also be impacted by the local angle or direction of the water surface at that point, as may be defined by the surface normal at that point. Cross-sectional view 220 of FIG. 2B illustrates a set of surface normal 222 at various points along the water surface 202. In at least one embodiment, a caustic map 240 can be generated as illustrated in FIG. 2C, wherein points along the water surface can be mapped to cells of a caustic map 240. The caustic map is then representative of the geometry of the water surface. In at least one embodiment, the points are selected at regular intervals or spacing across the water surface. These points can then be represented by a position and a surface normal at that position, which can be noted by a direction or vector. Various other representations for individual points can be used as well in other embodiments. When a light ray is incident on a point, as illustrated in FIG. 2A, the corresponding position and surface normal information can be used to determine a refracted direction and a reflected direction of that rate in the body of water for purposes of determining intersections with a nearby surface. The collection of intersection points on the surface can define the caustic pattern.

As mentioned, however, using only points for individual rays can require significant denoising, which can result in a somewhat blurry caustic pattern being generated. In at least one embodiment, a process can improve upon the surface caustics generated. This can involve, for example, counting the number of valid hit points and recording additional data including position and direction instead of only outputting the intensity of the ray hit points. One such approach to generating improved caustic patterns is referred to herein as photon difference scattering (PDS), in which each ray hit point is treated as a photon and rendered as a decal against the scene depth. Another such approach involves generating what is referred to herein as a procedural caustic mesh (PCM), which reconstructs the caustic network as a triangular mesh that can then be blended with the scene. As both approaches have strengths and weaknesses, a user may select or switch between these two options based on, for example, a preference for better performance or higher quality. In at least one embodiment, a cascaded caustic maps approach can be used with larger bodies of water, such as may utilize multi-scale rendering.

Figure 2D:
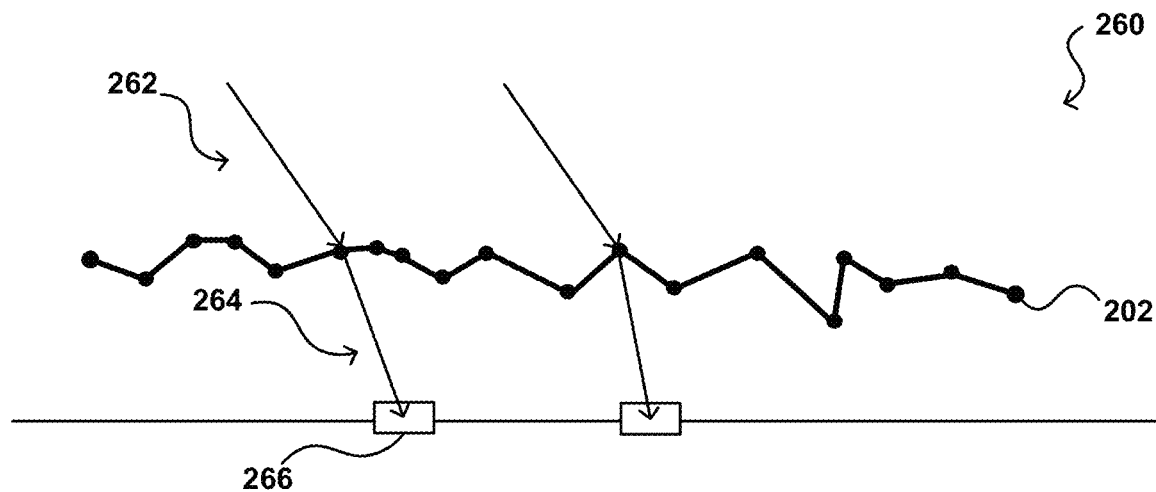
Figure 2E:
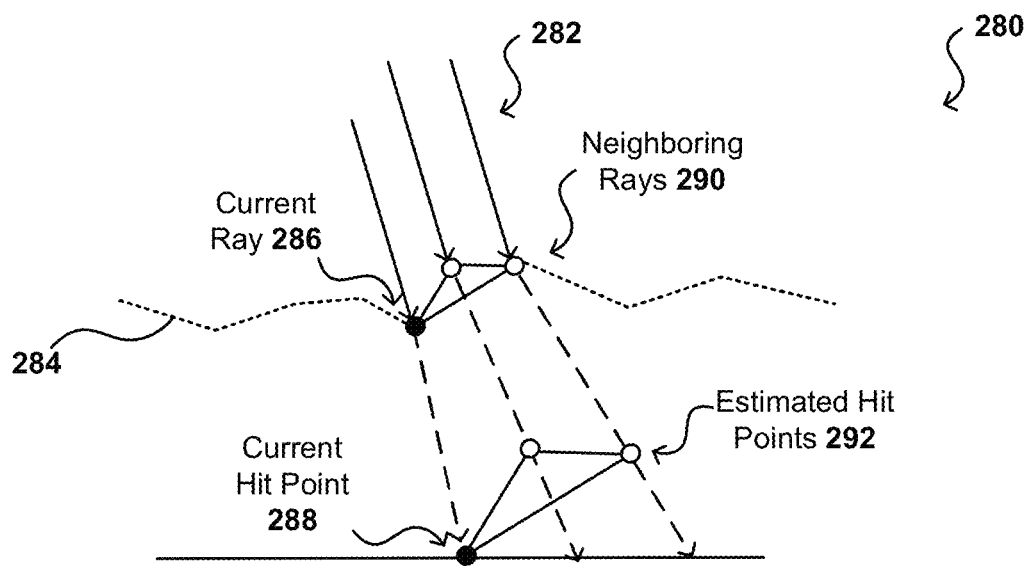

FIG. 2D illustrates a cross-sectional view 260 wherein quadrilateral photon footprints ("quads") 266 are generated at the hit points of reflected or refracted rays 264 on a surface, where the refracted rays 264 correspond to light rays 262 incident on a water surface 202. In at least one embodiment, these photon footprints can be rendered with equal size and brightness. In at least one embodiment, these photon footprints can be rendered as decals against scene depth. Rendering photon footprints at fixed size can form correct caustic envelopes, but may result in gaps in between. In order to fill the scene surface with compact quads, it can be advantageous to determine a proper size for each footprint. Fortunately, for water caustics each ray can be cast from one single reflection or refraction, such that a ray can easily be back-traced to its origin in the caustics map, such as map 240 of FIG. 2C. From the caustics map, information can be obtained for adjacent rays, as may include the origins and directions of those rays. An appropriate size and shape of a given footprint can then be estimated using data for rays surrounding a respective hit point. FIG. 2E illustrates an example cross-sectional view 280 of such an approach. In such an embodiment, a current hit point 288 can be traced back to the point 286 where that ray intersects the water surface 284, for purposes of identifying a corresponding cell of the caustic map. A set of neighboring points can be selected from the caustic map. In at least one embodiment, this can include a determined set of neighboring points, such as two points in specific directions, such as to a top and a right of that cell in the map, where available. Different numbers of points can be used, in different or random directions, in various embodiments. A selection of two neighboring points in addition to the current hit point can be used as three points is the smallest number of points to define an area, while additional points may improve accuracy though with additional processing capacity and complexity needed. Once those neighboring points are determined, the corresponding neighboring rays 290 can be determined from the incident light rays 282, and those neighboring rays 290 used with the current ray 286 to determine the current hit point 288 and estimated hit points 292 for those three (or more) rays or points. The area of the estimated triangle can then be used to estimate the scale factor of the photon rectangle (266 in FIG. 2D), or other quadrilateral, where the scale factor equals the ratio of the area of the estimated triangle and the area of the triangle formed by the origins of the rays 286, 290. The intensity, size and orientation of the photon rectangle can then be adjusted one more times by the photon direction and the surface normal of the scene. Different footprint shapes can then be rendered and the lighting result calculated using the scene materials in the pixel shader during scattering. In at least one embodiment, the orientation of the rectangle is aligned with the photon direction and the surface normal, and the scaling factor along the photon direction is determined by the dot product of the photon direction and the surface normal. The intensity of the rectangle is adjusted by its area to get the correct brightness distribution of the whole caustics. Such an approach can utilize a finite difference of the data of nearby rays to compute photon coverage, which can generate more accurate results than using local perturbations as in photon differentials. As mentioned, while scaled rectangles are shown in FIG. 2D, other shapes such as other quadrilaterals can be used as well.

Using such an approach, quality can be achieved that is similar to that of the original caustics mapping method by casting much sparser rays, thus greatly improving ray tracing performance. Further, brightness adjustment by footprint coverage ensures a correct intensity distribution from all incident angles. In at least one embodiment, these footprints can form into continuous patterns without using any form of denoising. Such an approach has benefits in that it can render high quality water caustics with low cost, and support can easily be extended for many types of light sources, including area light sources. Such an approach may be sensitive to the resolution of the caustics map, however, particularly with respect to a range of effective coverage. Thus, applying a low-resolution caustics map to a large scene area may result in at least somewhat blurry caustic patterns.

Figure 3:
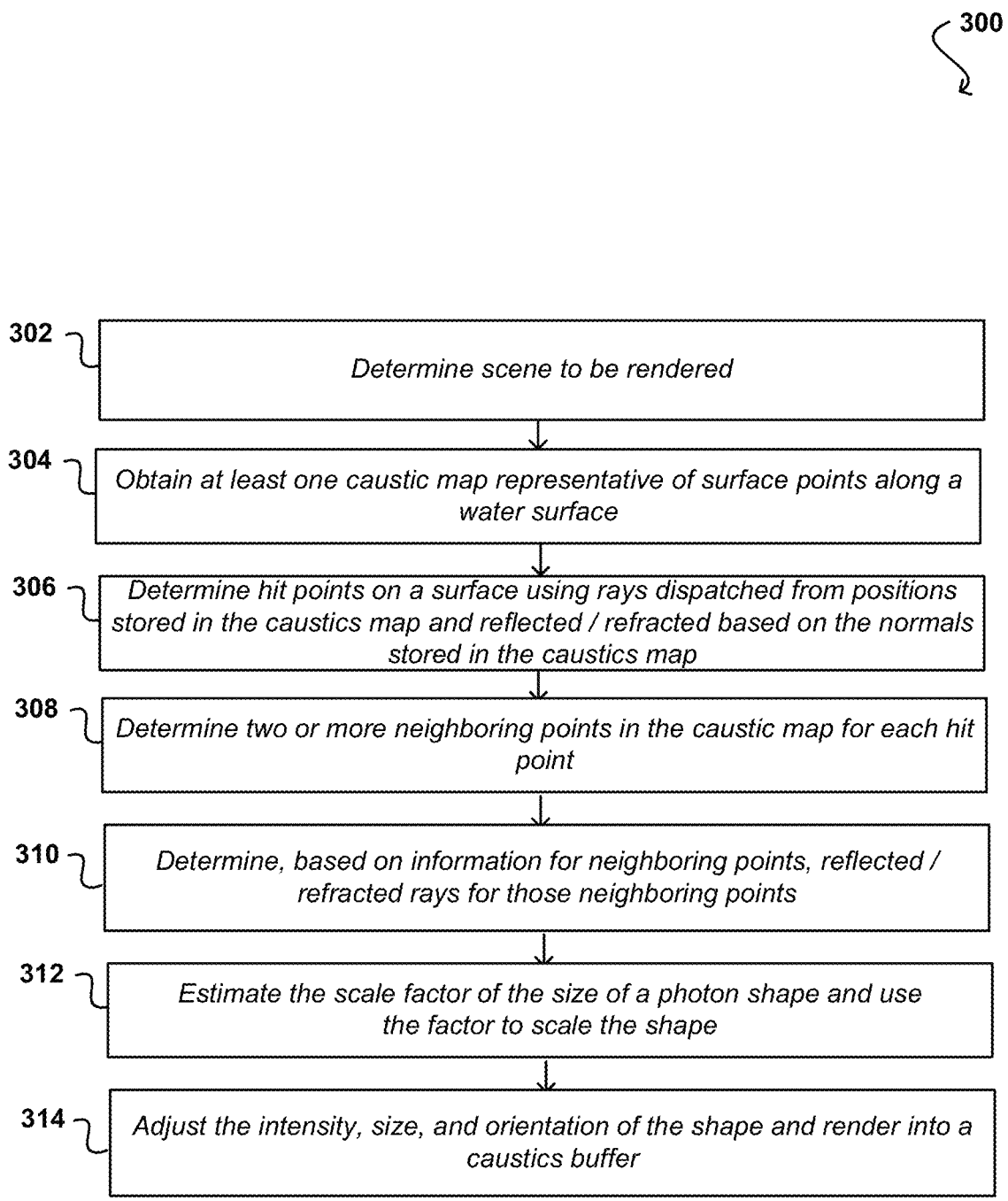
FIG. 3 illustrates an example process for determining water caustics, according to at least one embodiment.

FIG. 3 illustrates an example process 300 for rendering a caustics pattern that can be performed in accordance with various embodiments. It should be understood that for this and other processes presented herein that there can be additional, fewer, or alternative steps performed in similar or alternative order, or at least partially in parallel, within scope of various embodiments unless otherwise specifically stated. In this example, a scene to be rendered 302 is determined, as may correspond to a level of a video game or a scene of animation. In this scene, there can be at least one body or region of water that may generate a caustic pattern. In order to determine the appropriate caustic pattern, at least one caustic map can be obtained 304 that is representative of surface points along the surface of a body or region of water. In at least one embodiment, this map can be obtained by determining a set of equally spaced points along a rest plane for a water surface, and obtaining position (e.g., displacement) and surface normal information. In another embodiment, points may be selected that may not be equally spaced in such a way, such that the position data may include coordinates or other distance or position information. The caustic map can be used to determine how light rays, incident at those points, are reflected and refracted by the water surface. Rays refracted and reflected by the water surface may be incident on the surface of the water or on the surfaces of one or more objects above or below the water surface (e.g., a bridge, beach, river bank, etc.), which can correspond to a set of hit points along that surface. In at least one embodiment, one caustic map can be used to store position data and a second caustic map used to store surface normal data, due at least in part to the size of the data contained in each map.

Determinations of photon rectangles, or other geometric regions or shapes, can be made for at least some of these hit points, where the size of the photon rectangles can be scaled. A hit point can be determined 306 for that surface, such as by dispatching a ray from a corresponding position in the caustic map and reflected/refracted based on the corresponding normal. Two or more neighboring points can be determined 308 or selected from the caustics map, such as a first point above and a second point to the right of a current point, where available. Based at least in part upon the information stored for these neighboring points, reflected and refracted rays can be determined 310 for these neighboring points that may generate respective hit points on the surface. The current hit point can be used with these estimated hit points to estimate 312 a scale factor that can be used to scale that shape, such as a photon rectangle (or other geometric shape or region) to be projected onto that surface. An intensity, size, and/or orientation of that photon rectangle can then be adjusted 314 again, such as by using the photon direction and the surface normal, then rendering the footprint shape and calculating the lighting result using the scene materials in the pixel shader as rendered to the caustics buffer. A caustic pattern can thus be rendered for insertion, or compositing, into the scene. In at least one embodiment, some amount of denoising may be applied to the caustics buffer to help eliminate any gaps in the caustic pattern, but this denoising should be applied in such a way as to not result in noticeable or unacceptable blurring of the pattern.

Figure 4A:
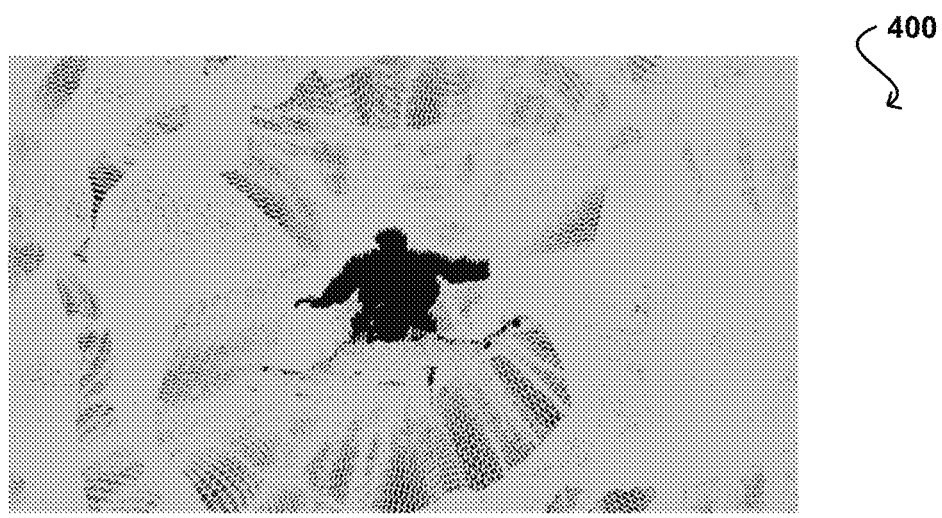
FIGS. 4A, 4B, and 4C images that can be generated as part of a procedural mesh-based approach, according to at least one embodiment.
Figure 4B:
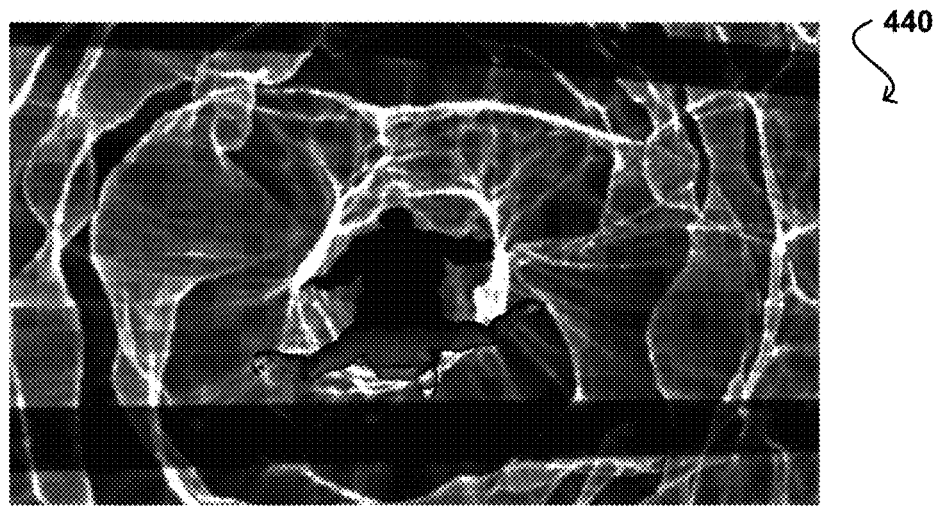

Another approach that can be used to generate caustic patterns from ray tracing involves conversion of hit points into an intermediate mesh, also referred to herein as a procedural caustic mesh. In generating such a mesh, each hit point is mapped to a vertex in the mesh whose topology is a list or set of triangles, or other such geometric shapes, that maps to regular grids on the caustics map. After a ray tracing pass, a compute shader can fetch the relevant hit point data, and can evaluate the contribution and intensity of each primitive according to its world space area. The compute shader can discard invalid primitives, and can generate an index buffer. The mesh can then be rendered onto the caustics buffer in a rasterization pass, as illustrated in image 400 of FIG. 4A. This refracted caustic mesh includes a shadow area culled from the mesh. The image 440 of FIG. 4B illustrates the rendered pattern resulting from the mesh as modulated by scene materials. In at least one embodiment, there can be two procedural caustic meshes built for every water object, including one for reflection and one for refraction. A reflection and/or refraction mesh can be projected onto the surface as illustrated in FIG. 4B to generate an accurate caustics pattern.

In at least one embodiment, a relatively low resolution caustic map can be used, and each point or photon of that map can be treated as a vector. The photons can be rendered together as a mesh, where the connectors or links of the mesh connect adjacent photons. When a hit point of a photon is determined, the position of the hit point can be used to replace the position information of the corresponding vertex. This mesh can then be projected onto a surface. Projection of such a mesh can produce sharp patterns using relatively few points or photons. Such an approach enables rendering of very clear caustics even when using a low resolution caustics map. As mentioned, the density of the triangles (or other mesh shapes) can be determined according to the area of those triangles, where smaller areas will result in brighter areas that help to make the caustics appear correctly.

Figure 4C:
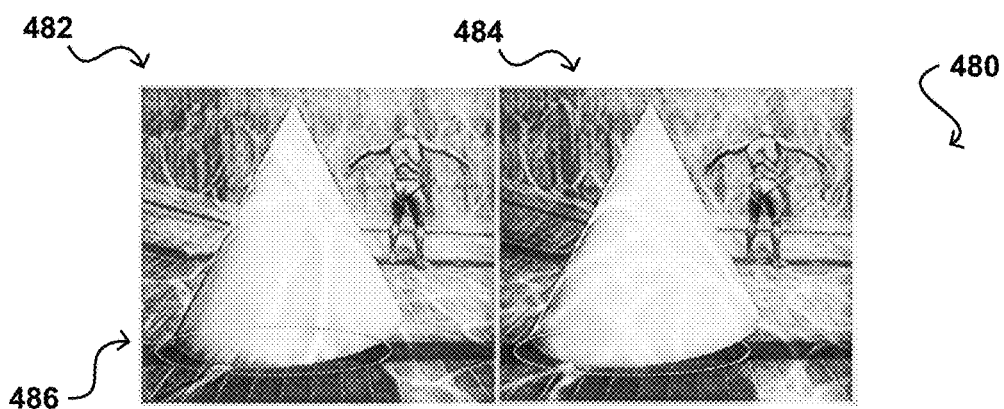

An advantage of an approach that utilizes such a procedural mesh is that it produces sharp caustic patterns, even though a resolution of the caustics map itself may be relatively low. Such a mesh-based approach can also support large bodies or regions of water. A potential disadvantage of such an approach is illustrated in the pair of images 480 of FIG. 4C. The image 482 on the left illustrates a caustic pattern generated using a procedural mesh. While the pattern itself is clear and accurate, there are some black edge artifacts 486 present, particularly near sharp corners and edges. At these sharp features, the mesh triangles may span over the culling region, resulting in areas of lower brightness. The image 484 on the right shows the same view rendered using photon difference scattering, where no such artifacts are visible. A mesh-based approach may then be preferable for surfaces or terrain without complicated edges or surfaces.

In at least some embodiments, then, it may be beneficial to provide both approaches and enable selection of an approach that will produce the best, or better, result. For example, a frame may be rendered using both a procedural caustic mesh and using photon difference scattering. In at least one embodiment, a user can then select the approach that provides a preferred or desired quality-performance balance. In some embodiments, a process might select one of these approaches based at least in part upon information for the scene, such as a size of a body of water to be rendered or a roughness of a surface. For many scenes to be rendered, photon difference scattering may prove to be more flexible and better suited for water areas in a confined space, such as a like swimming pool. A procedural caustic mesh-based approach may prove more efficient when rendering large water bodies, such as lakes or an ocean.

Figure 5:
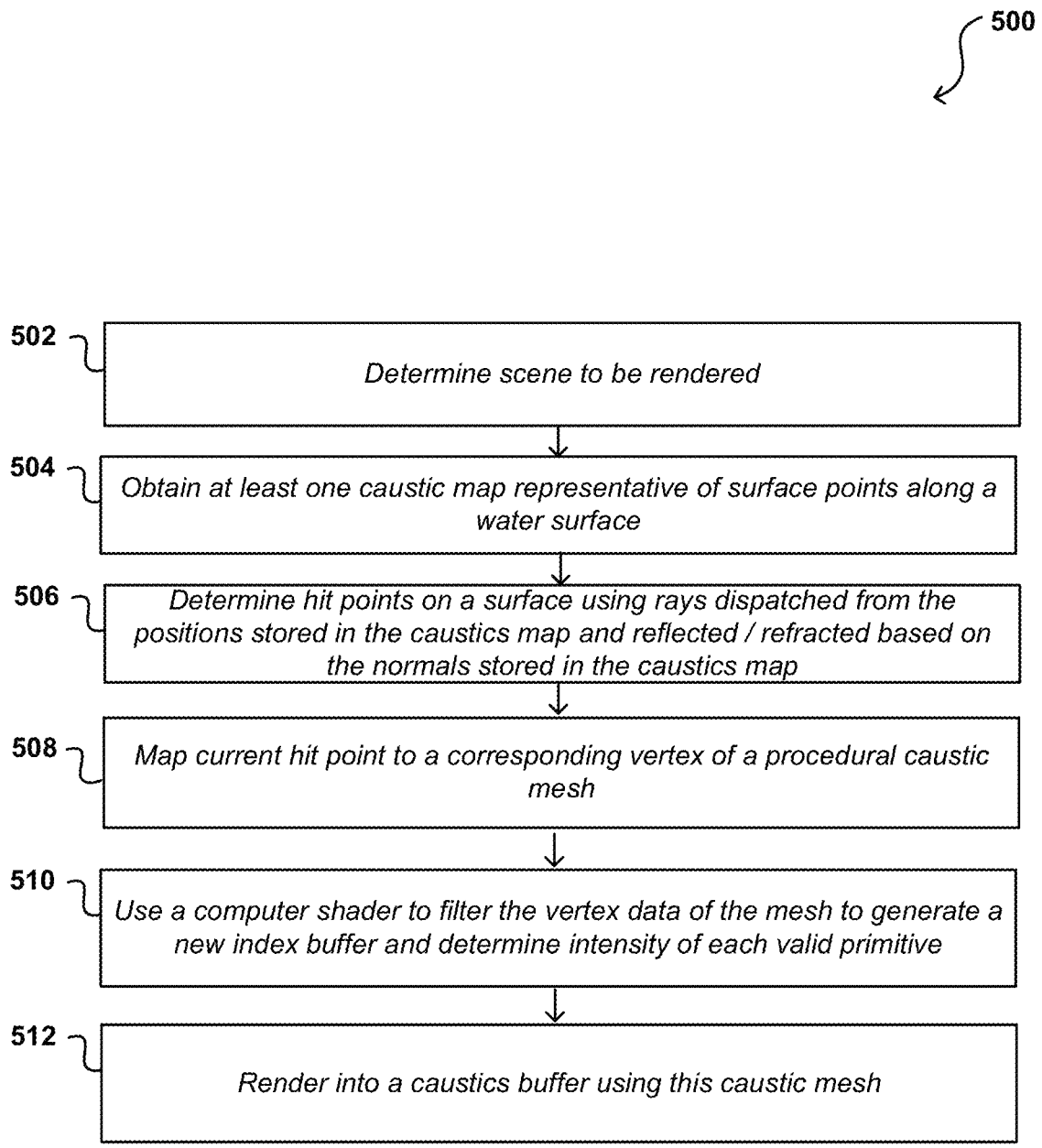
FIG. 5 illustrates an example process for generating water caustics using a caustic mesh, according to at least one embodiment.

FIG. 5 illustrates another example process 500 for rendering a caustic pattern that can be performed in accordance with at least one embodiment. In this example process, a scene to be rendered 502 is determined, as may correspond to a level of a video game or a scene of animation. In this scene, there can be at least one body or region of water that may generate a caustic pattern. In order to determine the appropriate caustic pattern, at least one caustic map can be obtained 504 that is representative of surface points along the surface of a body or region of water. In at least one embodiment, this map can be obtained by determining a set of equally spaced points along a rest plane for a water surface, and obtaining position (e.g., displacement) and surface normal information. In another embodiment, points may be selected that may not be equally spaced in such a way, such that the position data may include coordinates or other distance or position information. In at least one embodiment, one caustic map can be used to store position data and a second caustic map used to store surface normal data, due at least in part to the size of the data contained in each map. The caustic map can be used to determine how light rays, incident at those points, are reflected and refracted by the water surface. Rays refracted and reflected by the water surface may be incident on the surface or one or more objects, or terrain, underneath the water surface, which can correspond to a set of hit points along that surface. The hit points on the surface can be used to generate a caustic mesh. A set of hit points can be determined 506 for that surface, such as by using light rays dispatched from the positions stored in the caustics map and reflected/refracted based on the respective normals stored in the caustics map, A selected hit point can be mapped 508 to, or used to specify, a corresponding vertex of a procedural caustic mesh. In at least one embodiment, a compute shader can be used 510 to filter the vertex data of the mesh to generate a new index buffer and determine an intensity of each valid primitive. This can then be rendered 512 into a caustics buffer using this caustic mesh. In at least one embodiment, this can include outputting information for the caustic pattern to a buffer until picked up by a rendering engine or other such component. In at least one embodiment, caustics information is temporarily stored to a caustics buffer in GPU memory, and then the data in the buffer is processed with a denoiser and composited onto the scene. Any appropriate denoiser may be used, such as an iterated cross-bilateral filter.

Figure 6A:
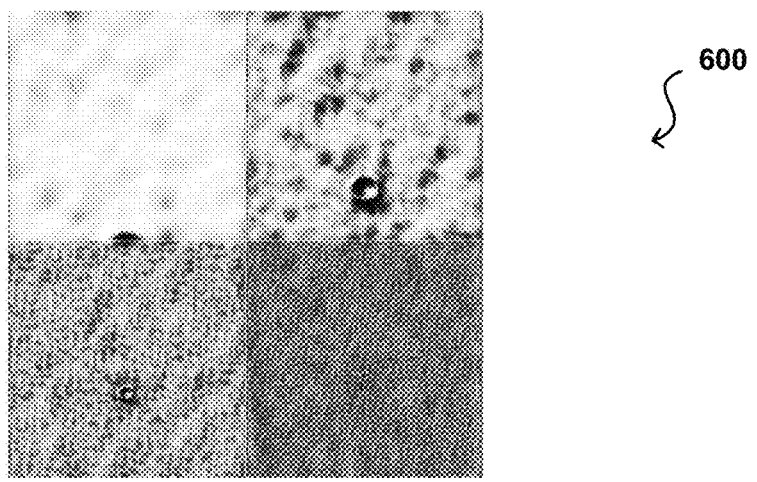
FIGS. 6A, 6B, and 6C illustrate enhancements that can be used when generating water caustics, according to at least one embodiment.
Figure 6B:
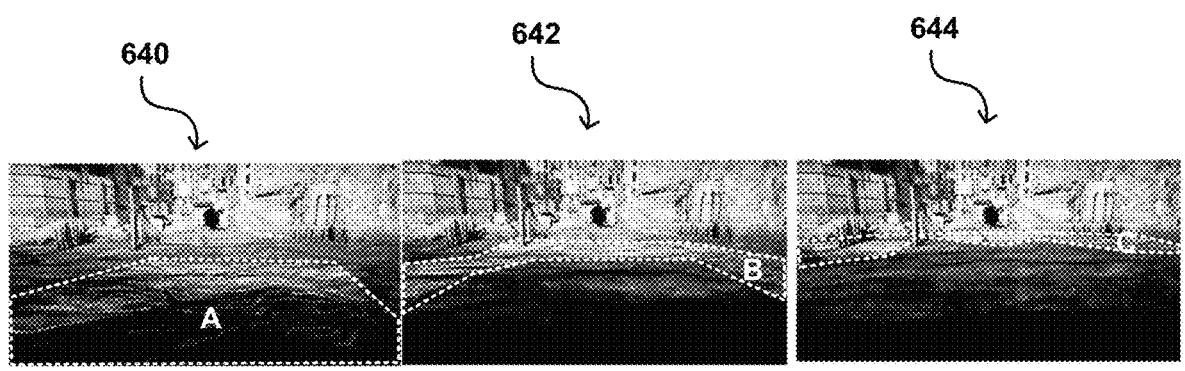

In at least one embodiment, it may be desirable to use caustic maps, but as mentioned these may produce blurry caustic patterns for large bodies of water. In order to render caustic effects with large water bodies such as ocean surfaces, an approach in accordance with various embodiments can utilize a sequence or cascade of caustic maps. FIG. 6A illustrates a configuration 600 of four cascades, where each cascade contains a caustics map at a user-selected resolution, zoom, or other level of detail. The cascades can be used at different locations at different distances from a virtual camera, as illustrated in FIG. 6B. In this example, there are three maps A, B, and C used for three different distances, as illustrated in images 640, 642, and 644. These map regions can approximate rings around a position of a virtual camera, with each ring corresponding to a range of distance from that camera. In image 640 a highest resolution map can be used for this closest region, while in image 644 a lower resolution map can be used for this region at a greater distance. In at least one embodiment, these cascaded maps can be used with photon difference scattering to mitigate a blurry result when rendering with a limited photon budget, but where but higher levels of details are desired, at least for points closer to a virtual camera in the scene. In at least one embodiment, such an approach enables more photons to be distributed at an inner-most cascade to improve the quality, and fewer photons to be distributed at outer cascades in order to improve performance and reduce cost.

In at least one embodiment, such cascades may not be used for a procedural mesh, which can already provide acceptable performance for large areas of water. Cascades can be used advantageously for approaches such as photon difference scattering, which can benefit from an effectively higher resolution caustic map but without the added expense of a true higher resolution map. These cascading maps can be used with PDS to render accurate caustics for large areas of water. In at least one embodiment, multiple caustic maps can be generated with the resolution of each map determined by factors such as the distance to the camera. As illustrated in FIG. 6A, for textures nearer the (virtual) camera, a higher resolution or zoomed map can be generated that provides for fine detail. Coarser caustics maps, with less detail, can be used further away from the camera. Thus, instead of generating one full resolution caustics map to cover a large area, less information and fewer rays can be utilized for larger area caustics, which can significantly improve performance. The number of cascades, and amount of detail for each cascade, can be user configurable in at least some embodiments, but may also be determined based upon factors such as the size of body of water for which cascades are to be rendered. In some embodiments each map of a cascade may be at the same resolution, such as 1,024×1,024 pixels, but may each have a different zoom level, or amount of fine detail. In other embodiments, each map may have a different size, shape, and/or resolution as appropriate. In at least one embodiment, lighting is reconstructed from each cascade based on the location of use, and these locations can be selected to avoid significant gaps or overlaps in the caustics patterns generated. The cascades can be positioned in different arrangements or configurations as well, such as concentric rings, parallel rectangular regions, or stacked arcs, among other such options.

Figure 6C:
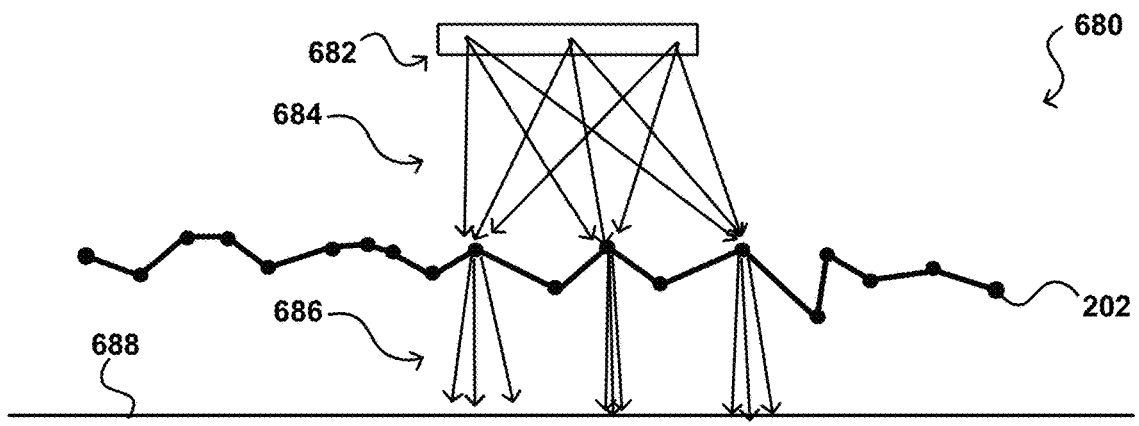

Such approaches can also be expanded to account for different types of light sources. In at least some embodiments, point light sources can be used for which each point along a surface will have one incident ray from that light source, which can be substantially parallel rays for light sources at a great distance. There might be an area light source, however, for which there may be multiple incident rays at any given surface point. This is illustrated in view 680 of FIG. 6C, wherein an area light source 682 can have many points from which light rays can be emitted, where the number of points may be based at least in part upon a resolution of the scene and a size of the area light source 682. As illustrated, each point of the area light source 682 can emit light rays 684 in multiple directions, and each surface point may have light rays incident from multiple points on the area light source 682. Each of these incident rays can be refracted and reflected by the water surface 202 to produce a refracted ray 686 that can generate a hit point on the surface 688. Generating an accurate caustic pattern based on such a large number of rays may be too expensive or may not be fast enough to satisfy various performance requirements. Accordingly, approaches in accordance with various embodiments can extend at least photon difference scattering (PDS) to approximate patterns based on these rays. In addition to supporting textured rectangular lights that are widely used as luminaries, for example, such a technique can also accommodate more complicated area lights. A rectangular light emits photons from a planar rectangle with a given dimension, allowing users to simulate any kind of planar light source by applying a texture defining the surface intensity. Unlike other light types, the photons emitted in all directions across its surface can generate water caustics that exhibit "softness," or soft shadows, cast by area lights.

In at least one embodiment, this phenomenon can be represented in real time using a temporal process to generate the caustics over multiple frames. Such a process can involve, for each valid point on the caustics map in a current frame, randomly tracing an incident ray back to a random point on the area light and casting a ray from that point if it is not occluded. The resulting caustics can then be accumulated over several frames, as different rays will be analyzed for different frames. These rays in at least one embodiment can be accumulated using a temporal denoiser to output the soft caustics. Using such an approach, acceptable soft water caustic patterns can be produced from the area lights at a similar cost as is incurred for other light types, and with similar levels of realism.

Figure 7:
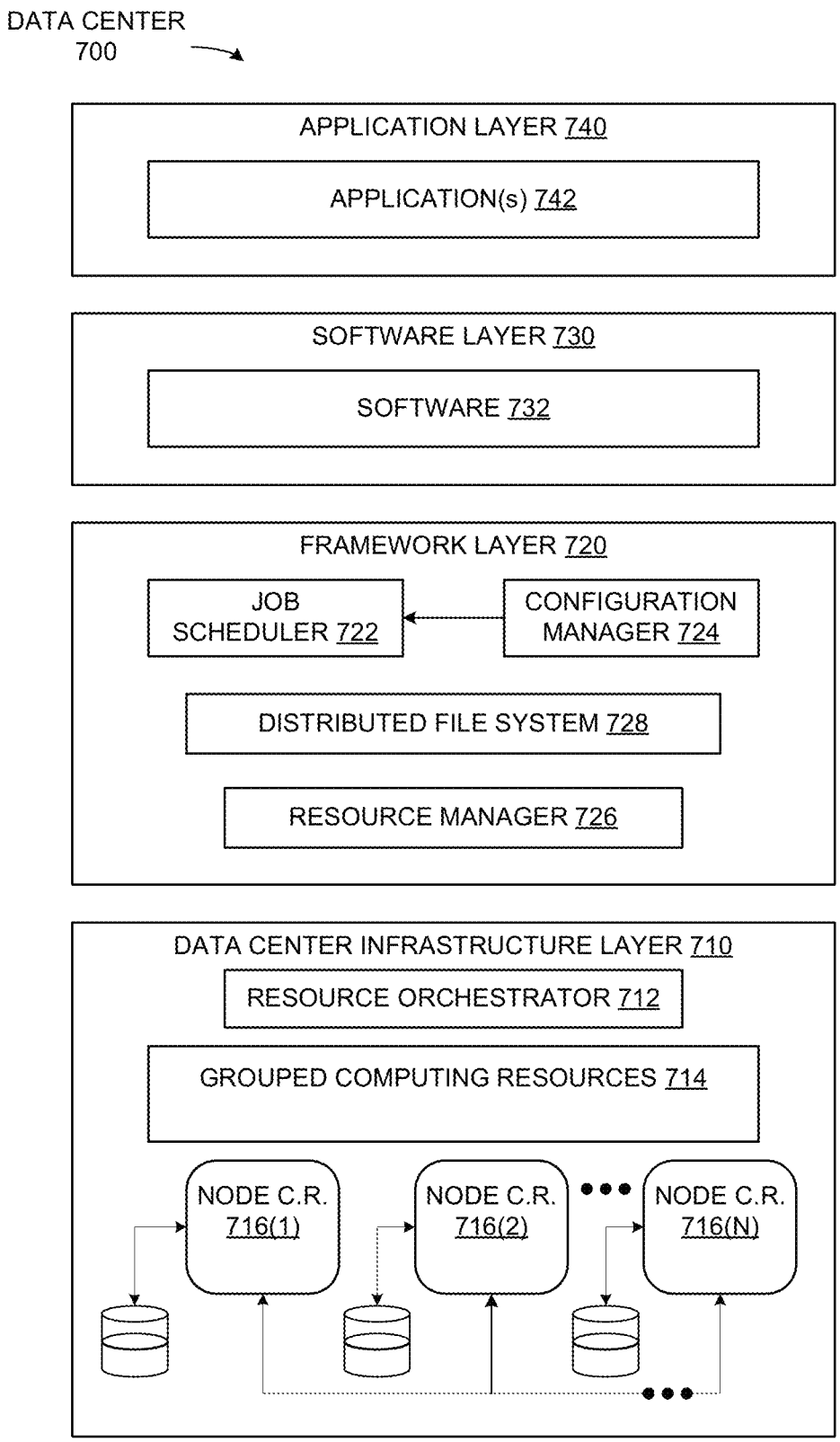
FIG. 7 illustrates an example data center system, according to at least one embodiment.
Figure 8:
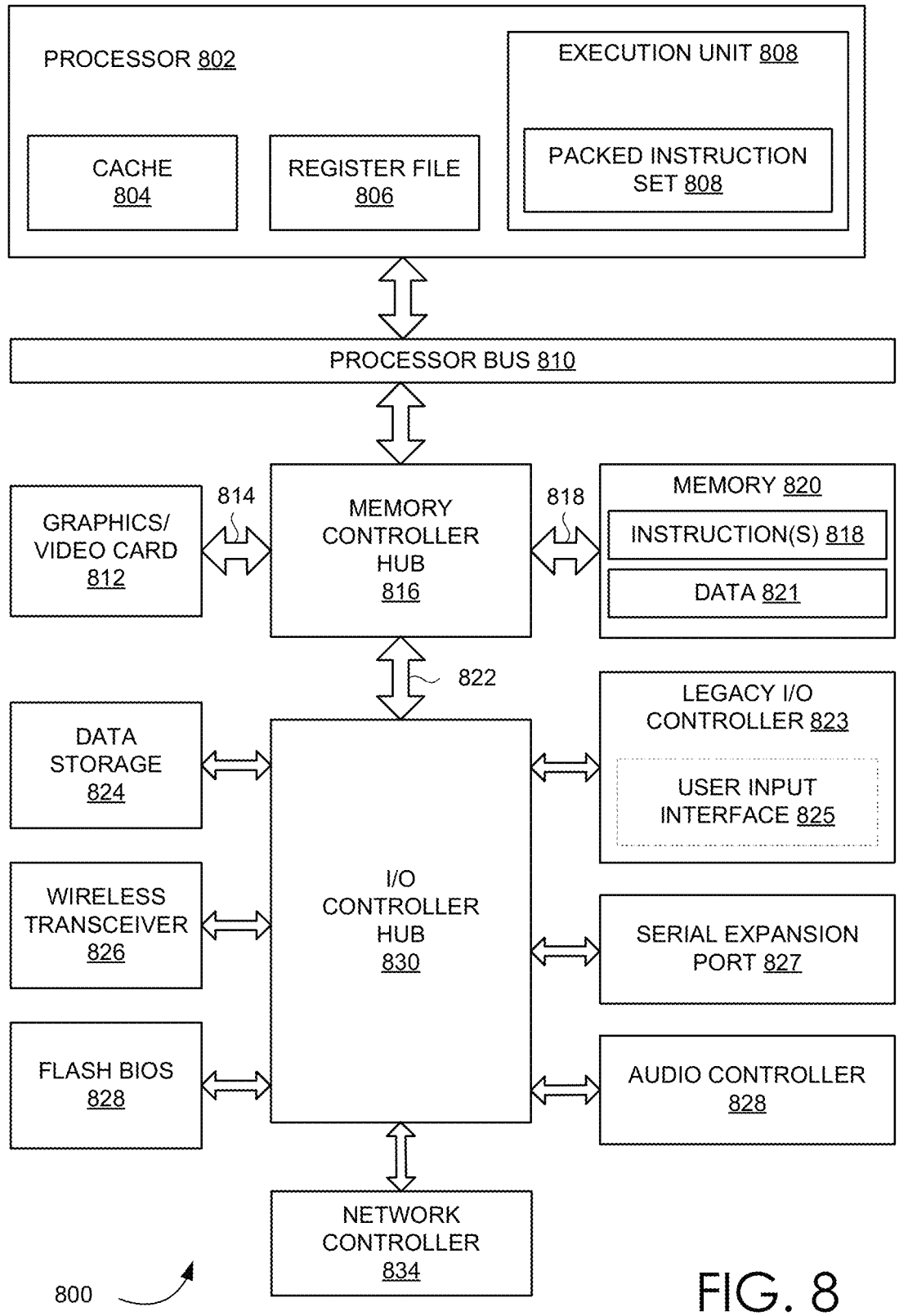
FIG. 8 illustrates a computer system, according to at least one embodiment.

This rendering can be performed on a standalone client device, or a remote server in a data center, among other such options. FIG. 7, discussed in more detail below, illustrates example components of a data center, while FIG. 8 illustrates components of a computer, such as a desktop computer or content server. Generation of caustics patterns in at least one embodiment can be performed in a graphics processing unit (GPU) that supports ray tracing, as discussed with respect to FIGS. 10 and 11, but can also be executed using CPUs, combination GPU/CPUs, or other such processing devices.

Data Center

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used to generate high-quality, physically-based water caustics effects in real-time with acceptable performance.

Computer Systems

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used to generate high-quality, physically-based water caustics effects in real-time with acceptable performance.

Figure 9:
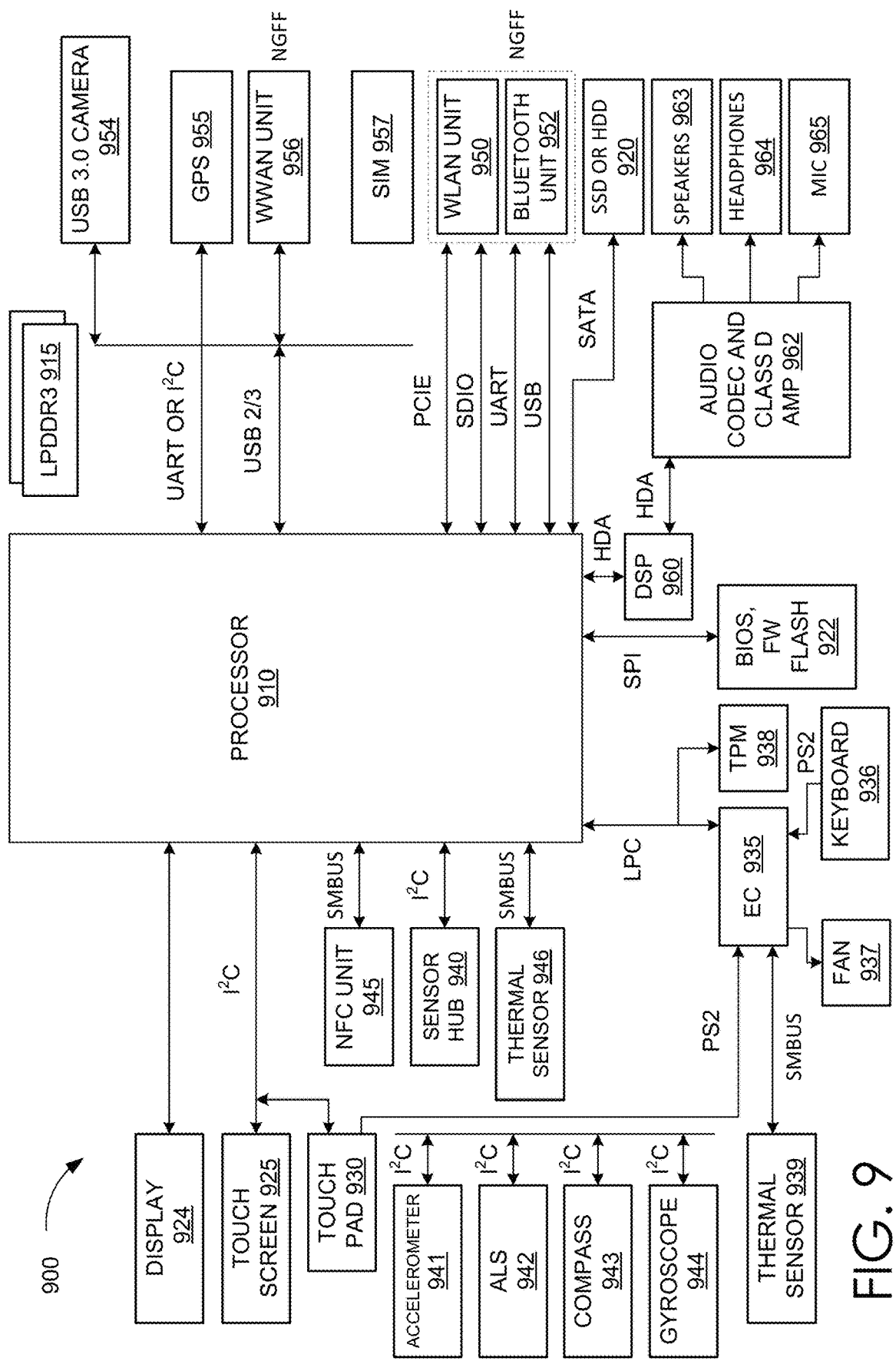
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used to generate high-quality, physically-based water caustics effects in real-time with acceptable performance.

Figure 10:
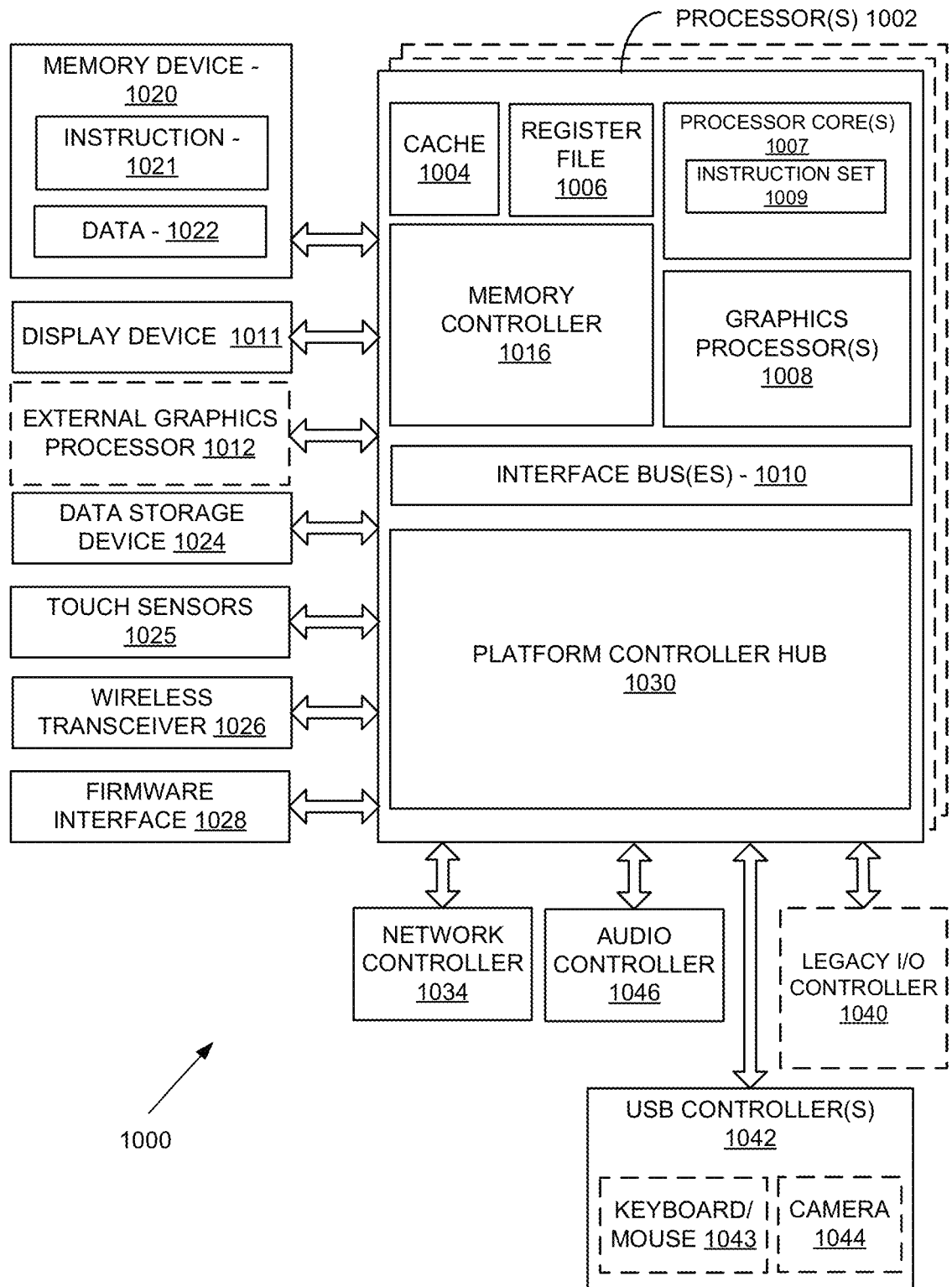
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used to generate high-quality, physically-based water caustics effects in real-time with acceptable performance.

Figure 11:
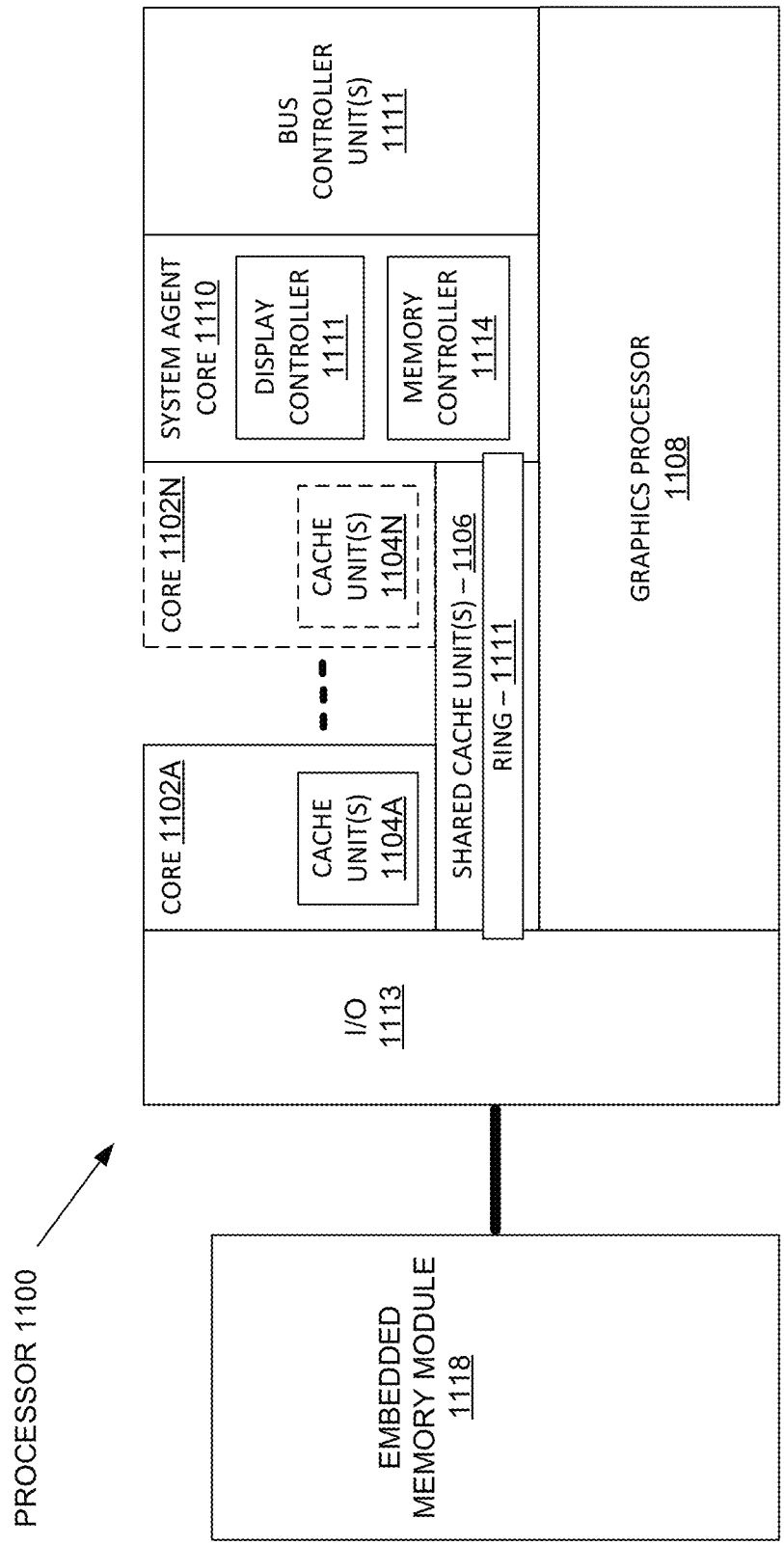
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used to generate high-quality, physically-based water caustics effects in real-time with acceptable performance.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
   performing, for a plurality of surface points spaced across a first surface, ray tracing from a light source to be incident on the surface points and reflected or refracted to a plurality of hit points on a second surface;
   determining a plurality of scale factors based, at least in part, on individual traced rays and one or more neighboring traced rays; and
   causing a caustic pattern to be rendered on the second surface by projecting one or more geometric shapes accumulated for the plurality of hit points according to the respective scale factors.

2. The computer-implemented method of claim 1, wherein the caustic pattern is caused to be rendered based, at least in part, on a scene of image data.

3. The computer-implemented method of claim 1, wherein causing the caustic pattern to be rendered further comprises:
   generating a caustic map representing portions and surface normals for the plurality of surface points.

4. The computer-implemented method of claim 1, wherein performing the ray tracing from the light source further comprises:
   determining a set of hit points based, at least in part, on an intersection of one or more rays from the light source with a surface.

5. The computer-implemented method of claim 3, further comprising:
   determining, for an individual hit point of the set of hit points, a size of a geometric shape associated with the individual hit point, the size of the geometric shape determined based, at least in part, upon at least two neighboring points for the corresponding surface point in the caustic map.

6. The computer-implemented method of claim 3, further comprising:
   determining one or more brightness values for portions of the caustic pattern based at least in part upon a size of the one or more geometric shape.

7. The computer-implemented method of claim 1, further comprising:
   storing data for the caustic pattern to a caustics buffer; and
   processing the caustic pattern using a denoiser to generate a continuous caustic pattern to be composited with the scene.

8. The computer-implemented method of claim 1, wherein causing the caustic pattern to be rendered further comprises:
   adjusting at least one aspect of the one or more geometric shapes according to a photon direction and a surface normal of a scene, the at least one aspect being at least one of intensity, size or orientation.

9. A system, comprising:
   at least one processor; and
   memory storing instructions that, when executed, cause the system to:
   determine a plurality of scale factors based, at least in part, on individual traced rays and one or more neighboring traced rays; and
   cause a caustic pattern to be rendered on a surface by projecting one or more geometric shapes accumulated for a plurality of hit points according to the plurality of scale factors.

10. The system of claim 9, wherein the instructions when executed further cause the system to:
    determine one or more brightness values for portions of the caustic pattern based, at least in part, upon the size of the one or more geometric shapes.

11. The system of claim 9, wherein the instructions when executed further cause the system to:
    perform, for a plurality of surface points spaced across a second surface, ray tracing from a light source to be incident on the surface points and reflected or refracted to the plurality of hit points on the surface.

12. The system of claim 11, wherein the hit points for the corresponding surface points correspond to vertices of a caustic mesh.

13. The system of claim 11, wherein the light source is a textured area light source, and wherein one or more random rays from the light source to the set of surface points are selected in each of a sequence of images and accumulated to approximate the caustic pattern from the textured area light source.

14. The system of claim 9, wherein the instructions when executed further cause the system to:
    store data for the caustic pattern to a caustics buffer; and
    process the caustic pattern using a denoiser to generate a continuous caustic pattern to be composited with a scene.

15. A system, comprising:
    at least one processor; and
    memory storing instructions that, when executed, cause the system to:
    determine a plurality of scale factors based, at least in part, on individual traced rays; and cause a caustic pattern to be rendered on a surface by projecting one or more geometric shapes accumulated for a plurality of hit points according to the plurality of scale factors.

16. The system of claim 15, wherein the instructions when executed further cause the system to:
   store data for the caustic pattern to a caustics buffer; and
   process the caustic pattern using a denoiser to generate a continuous caustic pattern to be composited with a scene.

17. The system of claim 15, wherein the instructions when executed further cause the system to:
   perform, for a plurality of surface points spaced across a second surface, ray tracing from a light source to be incident on the surface points and reflected or refracted to the plurality of hit points on the surface.

18. The system of claim 17, wherein the light source is a textured area light source, and wherein one or more random rays from the light source to the set of surface points are selected in each of a sequence of images and accumulated to approximate the caustic pattern from the textured area light source.

19. The system of claim 15, wherein the plurality of scale factors are based, at least in part on, one or more neighboring traced rays.

20. The system of claim 15, wherein the instructions when executed further cause the system to:
   render the caustic pattern for display in real time according to a determined frame rate.

* * * * *